June 7, 1927.  N. T. HENDRICKSON ET AL  1,631,864
FLY SWATTER
Filed May 11, 1926  2 Sheets-Sheet 1
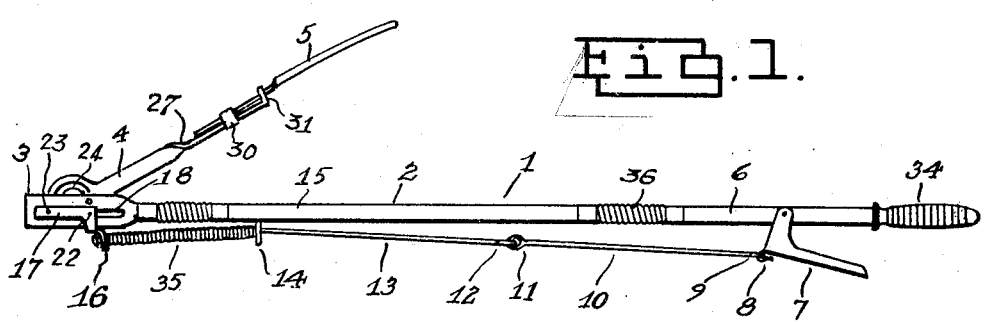
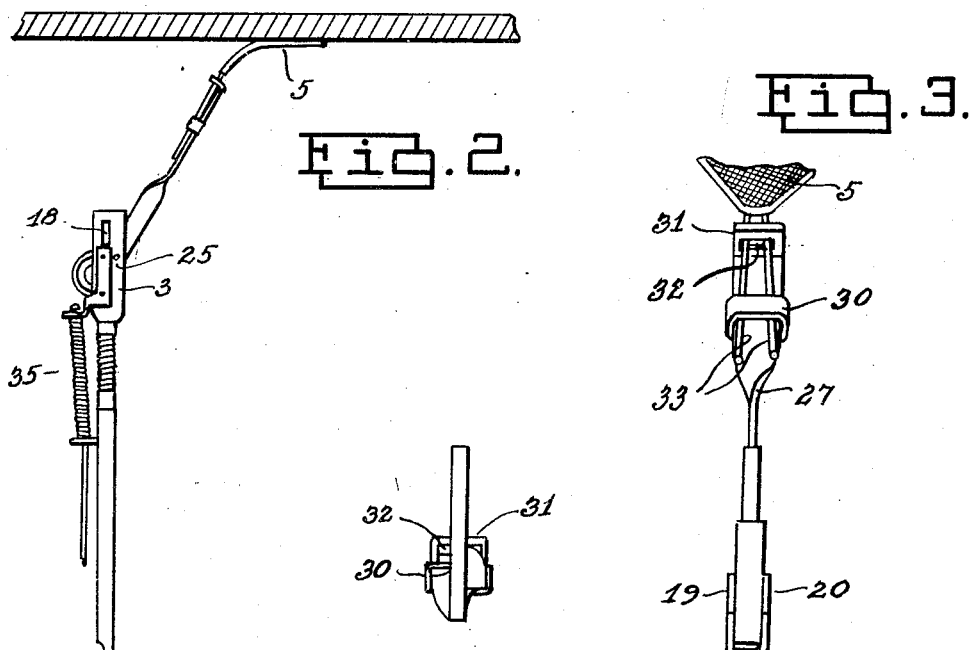
Inventor
N. T. Hendrickson and C. Roholt
By Geo. W. Eddert
Attorney June 7, 1927.                    N. T. HENDRICKSON ET AL                    1,631,864
                                      FLY SWATTER
                                   Filed May 11, 1926                    2 Sheets-Sheet 2
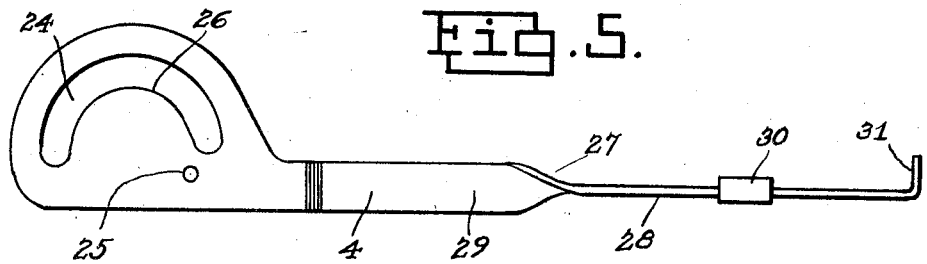
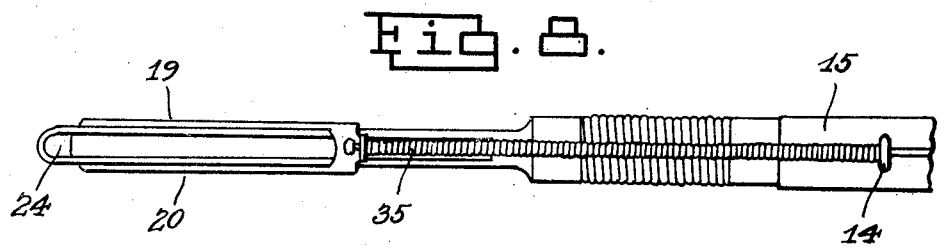
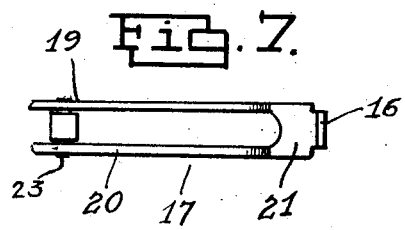
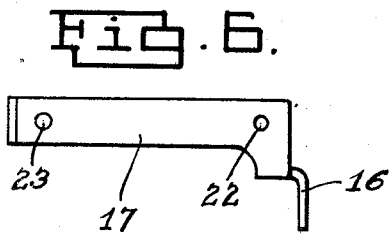

Patented June 7, 1927.

1,631,864

UNITED STATES PATENT OFFICE.

NORTON T. HENDRICKSON AND CHARLES ROHOLT, OF HOOPLE, NORTH DAKOTA.

FLY SWATTER.

Application filed May 11, 1926. Serial No. 108,356.

This invention relates to improvements in fly swatters and has for its object to provide a swatter which may be readily operated against the ceiling of a room.

Another object of the invention is to provide a fly swatter so formed that it may be operated against the ceiling or portions of the wall ordinarily out of reach.

A still further object of the invention is to provide a lever controlled fly swatter.

Another object of the invention is to provide a fly swatter having an extensible handle.

With the above and such other objects in view as may hereinafter more fully appear, we have invented the device shown in the accompanying illustration, in which:

Figure 1 is a side elevational view of our improved fly swatter, shown in one position;

Figure 2 is a similar view shown in operative position;

Figure 3 is an end elevational view thereof;

Figure 4 is a detail, end elevational view of a swatter carrying arm;

Figure 5 is a side elevational view thereof;

Figure 6 is a detail view of a slide;

Figure 7 is a plan view of the same before being formed;

Figure 8 is another side elevational view of the device.

Like reference characters indicate like parts throughout the following specification, and in the several views in the drawings in which 1 indicates a fly swatter consisting of an extensible rod 2, having a head 3, upon which is pivotally mounted an arm 4, for carrying the fly swatter 5. The section 6 of the rod 2, is provided with a hand control lever 7, having a hook 8, which the eye 9 of the link 10 detachably engages, the latter link being connected by a loop 11, to the hook 12 of the rod 13, which passes through an eye 14, in the upper end of the section 15, of the rod 2, and is secured to the offset 16 of the slide 17, operating in the slot 18 in said head 3. The slide 17, consists of a pair of parallel members 19 and 20, connected at one end by a U-shaped integral connection 21, from which the member 16 projects at right angles. The members 19 and 20 are connected by pins 22 and 23 which project through the slot 18, the pin 23 also projecting through the arcuate slot 24, in the head 25 of the arm 4, which is pivotally connected to the member 3 by the pivot pin 25. The pin 23 rides over the cam 26 of the member 25. The arm 4, is twisted at 27, in order that its outer end 28 may be at right angles to the part 29 thereof, said part 28 having a strap 30, and a right angular end 31, with an opening 32 which opening and strap 30 receive the spring arm 33 of the fly swatter 5, said arms being held secured to the members 28, 30 and 31, through the spring tension thereof.

In operation the operator holds the handle 34 in one hand and places his other hand around the bar 6, and lever 7, in order that upon pressing down upon the lever 7, the rod 13 is drawn down against the tension of the spring 35, coiled around the upper end of the rod 13, and seating between the eye 14 and extension 16, drawing down upon the slide 17, and raising the swatter arm with force, through the operation of the pin 23, and the slot 24. Upon releasing the pressure from the lever 7, the spring 35 will force the swatter to its lowered position. The members 6 and 15 are held together by screw joints 36.

Where the ceilings are exceptionally high, an additional section may be added to the rod 2, and a longer link substituted for link 10, said section having screw connections for inserting between the sections 6 and 15.

Pin 23 contains a roller bearing operating in slot 24.

Having described our invention, that which we claim to be new and desire to procure by Letters Patent is:

1. In a device of the character described, a rod terminating in a slotted head, a slide operating in the slot and a lever controlled by said slide, said rod being extensible, a link and lever connection for operating the slide, said link being extensible.

2. In a fly killing device a rod, a swatter carrying arm pivoted thereto and means for operating said arm, a fly swatter removably secured to said arm, said rod being extensible, said means including a hand lever, said rod having a slotted head, said arm operating in said slot, said head being slotted at right angles to said other slot, a slide mounted upon said head and having pins projecting through said right angular slot, one of which engages said arm.

3. As claim 2, and—said arm having an enlarged head carrying a cam slot through which said one pin operates.

4. As claim 2, and—said arm having an enlarged head carrying a cam slot through which said one pin operates, spring controlled means for operating said slide.

5. As claim 2, and—said arm having an enlarged head carrying a cam slot through which said one pin operates, spring controlled means for operating said slide, said means connected with said lever.

6. In a device of the character described a rod and a cam lever pivoted thereto, a fly swatter carried by said lever, a slide having a pin operating upon said cam, and means for operating said slide.

7. In a device of the character described a rod and a cam lever pivoted thereto, a fly swatter carried by said lever, a slide having a pin operating upon said cam, and means for operating said slide, said means being hand controlled.

8. In a device of the character described a rod and a cam lever pivoted thereto, a fly swatter carried by said lever, a slide having a pin operating upon said cam, and means for operating said slide, said means being hand controlled, and including a spring controlled link rod.

9. In a device of the character described a rod and a cam lever pivoted thereto, a fly swatter carried by said lever, a slide having a pin operating upon said cam, and means for operating said slide, said means being hand controlled, and including a spring controlled link rod, a detachable link connecting said rod and said hand lever.

In testimony whereof we affix our signatures.

NORTON T. HENDRICKSON.
CHARLES ROHOLT.